No. 792,043. PATENTED JUNE 13, 1905.
A. HULTQVIST.
BRAKING DEVICE FOR ELECTRIC MOTORS.
APPLICATION FILED MAR. 30, 1904.

3 SHEETS—SHEET 1.

Witnesses:
Oscar Malmer
Jacob Esbjörnson

Inventor:
Arthur Hultqvist

No. 792,043. PATENTED JUNE 13, 1905.
A. HULTQVIST.
BRAKING DEVICE FOR ELECTRIC MOTORS.
APPLICATION FILED MAR. 30, 1904.

3 SHEETS—SHEET 2.

Witnesses:
Oscar Malmer
Jacob Esbiörnson

Inventor:
Arthur Hultqvist.

No. 792,043. PATENTED JUNE 13, 1905.
A. HULTQVIST.
BRAKING DEVICE FOR ELECTRIC MOTORS.
APPLICATION FILED MAR. 30, 1904.
3 SHEETS—SHEET 3.
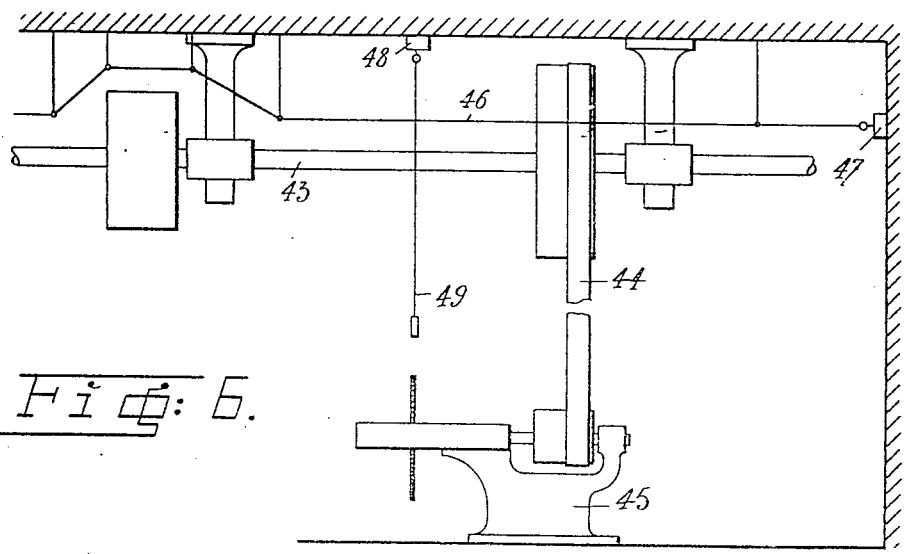
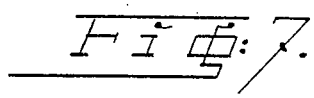
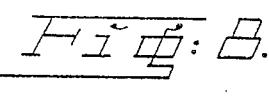
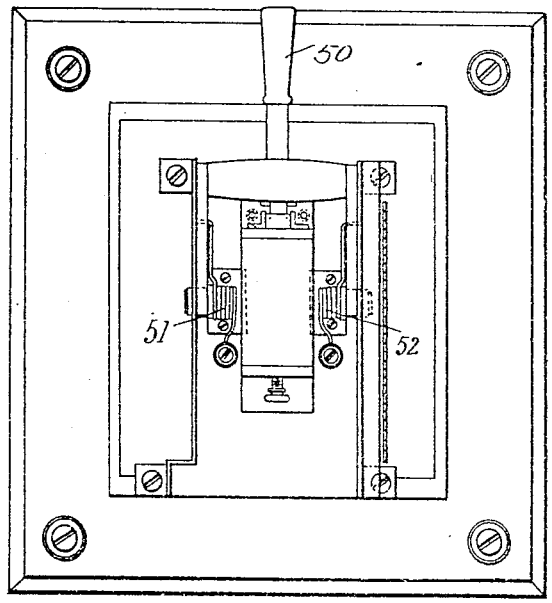
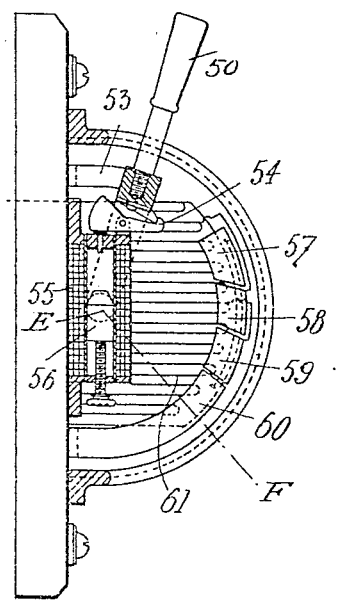
Witnesses:
Oscar Malmer
Jacob Esbjörnson
Inventor:
Arthur Hultqvist No. 792,043.

Patented June 13, 1905.

UNITED STATES PATENT OFFICE.

ARTHUR HULTQVIST, OF GÖTEBORG, SWEDEN.

BRAKING DEVICE FOR ELECTRIC MOTORS.

SPECIFICATION forming part of Letters Patent No. 792,043, dated June 13, 1905.

Application filed March 30, 1904. Serial No. 200,731.

*To all whom it may concern:*

Be it known that I, ARTHUR HULTQVIST, a subject of the King of Sweden and Norway, and a resident of Göteborg, Sweden, have invented new and useful Improvements in Braking Devices for Electric Motors, of which the following is a specification, reference being had to the drawings accompanying and forming a part hereof.

The present invention relates to a braking device for electric motors and machinery driven by electric motors, and has for its object to obtain, by means of changing the motor or motors into a generator or generators, a simple and instantaneously-acting emergency-brake which in cases of danger can be automatically thrown into operation for stopping the motor or the machinery driven thereby.

The invention consists principally in the combination of a switching device connected in the circuit of the motor or motors and adapted to change the motor or motors into generator or generators and means for automatically reversing the said switching device, so that the motor or motors will become generator or generators in a short circuit or a circuit furnishing a braking-current.

The invention further consists in the combinations and arrangements of parts hereinafter described and claimed.

In the accompanying drawings I have shown one way of carrying out my invention.

Figure 1:
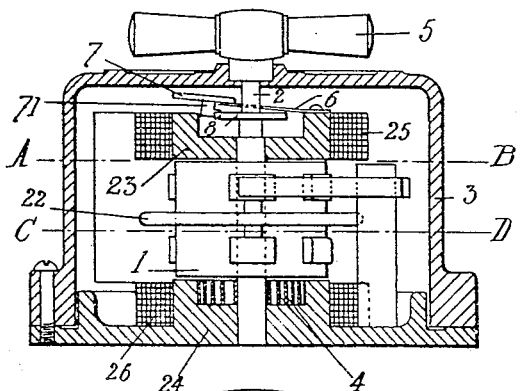
Figure 2:
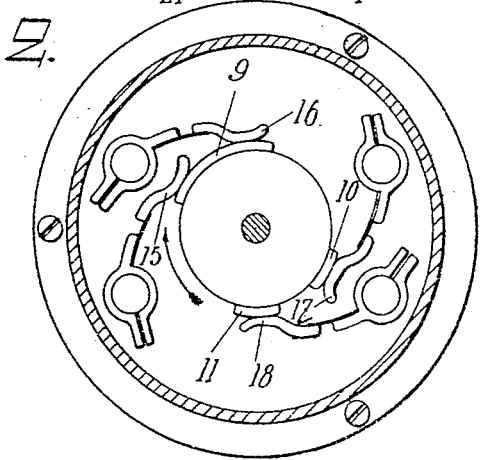
Figure 3:
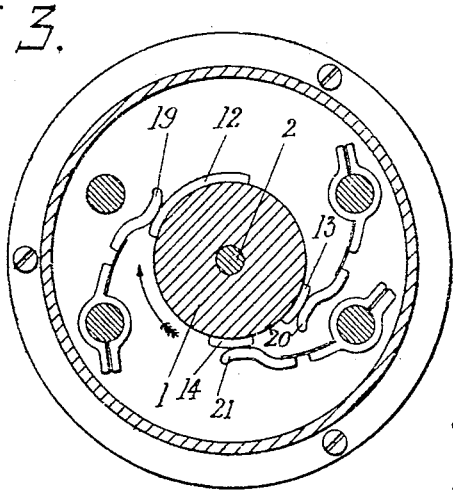
Figure 4:
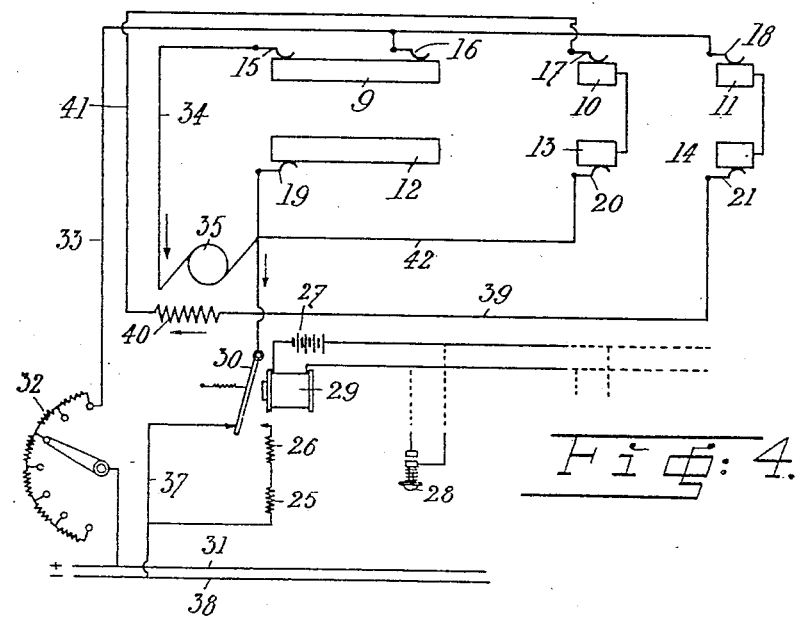
Figure 5:
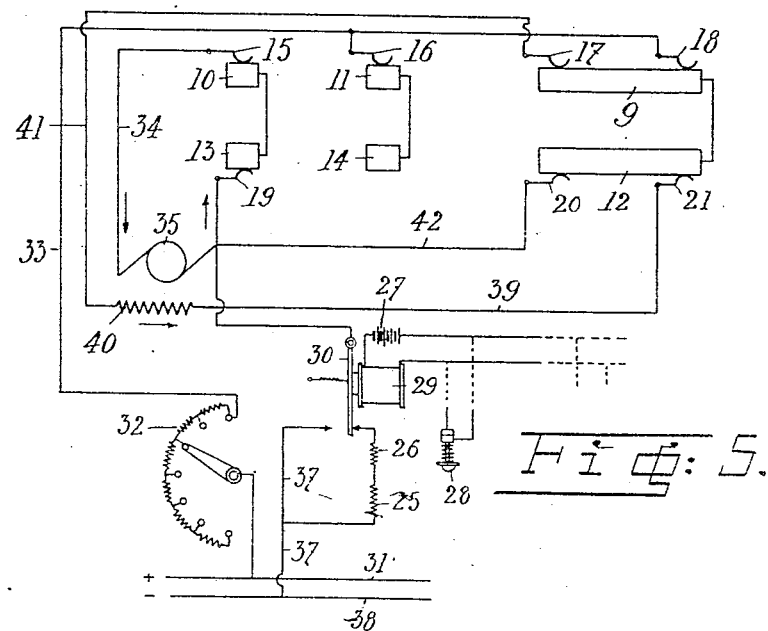

Figure 1 shows a vertical section through one form of the automatic switch. Fig. 2 shows a horizontal section of same on line A B of Fig. 1. Fig. 3 shows a horizontal section on line C D of Fig. 1. Fig. 4 shows a diagram of the circuits when the switch is in its normal position. Fig. 5 shows a diagram of the circuits after switching has taken place. Fig. 6 shows an application of the device. Figs. 7 and 8 show a modified arrangement of the switch.

Referring to Figs. 1 to 3, the switch shown consists of a rotary contact-drum 1, mounted on a shaft 2, journaled in a casing 3. The said shaft is provided at the bottom with a spring 4, the one end of which is secured to the bottom of the casing 3, while the other end is secured to the shaft 2, said spring tending to revolve the shaft, together with the contact-drum, in the direction indicated by the arrows in Figs. 2 and 3. The shaft 2 carries at the top a handle 5, by means of which the shaft and contact-drum can be revolved half a revolution for giving tension to the spring. When the switch is in its operating position, as shown in Figs. 1 to 3, the spring 4 is in tension, and the contact-drum 1 is held in this position by an armature 7, carried by a spring 6 and provided with a pawl 71, engaging with a disk 8, mounted on the shaft 2 and provided with a notch. The drum carries two series of contact-plates 9 10 11 and 12 13 14, engaged by contact-arms 15 16 17 18 and 19 20 21, respectively. The two series of contact-plates and contact-arms are separated by means of a flange 22, of insulating material, projecting from the contact-drum, in order to prevent as far as possible sparking or the formation of arcs in switching. For releasing the contact-drum, so as to cause it to be revolved into braking position by the spring 4, and for extinguishing any arcs formed in switching electromagnets are arranged at the ends of the contact-drum, consisting of iron cores 23 24, with magnetizing-coils 25 26. When the said coils, as will be hereinafter described, are traversed by a current, the iron cores and armature 7, with the pawl 71, are excited, so that the pawl 71 will be brought out of engagement with the disk 8, the contact-drum 1, actuated by the spring 4, being subsequently revolved half a turn and the switching for the braking action consequently effected.

The releasement of the switching device may, as shown in Figs. 4 and 5, be accomplished by means of a local circuit, comprising a battery 27, a number of pressure-buttons 28, arranged at convenient places in the circuit of said battery, and a relay 29, connected in the same circuit, the armature 30 of the said relay being arranged to connect the magnetizing-coils 25 26 of the switch into the motor-circuit when the relay is excited. The motor shown in Figs. 4 and 5 is a shunt-motor, and the connections are as follows in normal running, Fig. 4: The current passes from the positive main wire 31 through an ordinary regulating resistance 32 and to the wire 33. From the wire 33 the current flows partly through the contact-arm 16, contact-plate 9, contact-arm 15, wire 34, motor-inductor 35, the armature 30 of the relay, the wire 37, and to the negative main wire 38, partly through the contact-arm 18, contact-plate 11, contact-plate 14, contact-arm 21, wire 39, the field-magnet coil 40 of the motor, wire 41, contact-arm 17, contact-plate 10, contact-plate 13, contact-arm 20, wire 42, and subsequently, together with the inductor-current, through the armature 30 and wire 37 to the negative main wire. The current passes through the inductor and field-magnet coil in the direction indicated by the arrows. As evident from the above, the safety device here does not influence the running of the motor. On the other hand, if it should become necessary, owing to an accident or some other cause, to stop the motor instantaneously, this is done by means of the local circuit 27 28 29. By closing the circuit of the battery 27 by pressing the button 28 the relay 29 will be excited and attract its armature 30, whereby the said armature will bring the magnetizing-coils 25 and 26 of the switch into the circuit. The iron core 23 attracts the armature 7, supporting the pawl 71, so that the contact-drum 1 is released and by the action of the spring 4 is revolved half a turn into the braking position. In the said position, Fig. 5, the circuits are as follows: From the positive main wire 31 the current passes through the regulating resistance 32, wire 33, contact-arm 18, contact-plate 9, contact-arm 17, wire 41, the field-magnet coil 40 of the motor, wire 39, contact-arm 21, contact-plate 12, contact-arm 20, wire 42, armature 30, the magnetizing-coils 26 25 of the switch, and wire 37 to the negative main wire 38. The inductor-current passes from the positive pole of the motor-inductor through the wire 34, contact-arm 15, contact-plate 10, contact-plate 13, and contact-arm 19 back to the negative pole of the inductor. The field-magnet of the motor consequently is supplied with current from the wires 31 and 38, while the inductor is short-circuited. The directions of the current are indicated by arrows, showing that the field is reversed. It is evident, however, that the field also can be retained unchanged. The motor here acts as a generator furnishing current to the short circuit. In large motors the switch in order to avoid the risk of burning the inductor is preferably provided with contacts for introducing suitable resistances into the short circuit, the current generated being hereby prevented from exceeding the maximum allowed. The switch may eventually be arranged to introduce in the short circuit electromagnetic brakes for stopping the machinery. In general, however, changing the motor into a generator will no doubt suffice to stop the machinery almost instantaneously. It is evident that the invention also can be applied to series motors or compound motors. Many modifications, moreover, of the devices shown may be made without departing from the essential features of the invention. Thus, for instance, the pressure-buttons may be arranged as ordinary circuit-closers and combined with cords or like means which, as in mechanical safety devices, are arranged along transmission-shafts, &c., so that the said circuit-closers will be actuated for stopping the machinery in case a workman should be drawn into the transmissions as soon as the body of said workman comes into contact with the cord or the like. Such a device is shown in Fig. 6. Here 43 is a shaft assumed to be driven by an electric motor and transmitting power by means of a belt transmission 44 to a machine-tool 45. 46 is a safety-cord or the like arranged along the shaft 43 and connected at one end with a circuit-closer 47, arranged in a local circuit for changing the motor in the manner described above. When a person drawn into the transmissions touches the safety-cord, the circuit-closer 47 will be actuated, whereby the brake will be applied as above described. 48 is a circuit-closer assumed to be arranged in the same local circuit and to be actuated by hand by means of the cord 49.

In place of a separate battery-circuit it is evidently possible to connect the relay between the main wires. Eventually the magnetizing-coils of the switch may be so arranged as to be traversed by a current when the circuit is closed at a pressure-button or other circuit-closer, so that the change of connections takes place, and the relay consequently can be dispensed with. In place of a rotary contact-drum for switching it is also possible to make use of a switch provided with contact-knives or the like, which in normal running are held in a certain position by some suitable detent, the disengagement of which causes the movable part of the switch to be reversed, so that the contact-knives strike other contacts, and thus change the motor or motors into a generator or generators. Such an arrangement is shown as an example in Figs. 7 and 8. 50 is the rotary contact-arm, which is under the influence of spiral springs or the like 51 52, tending to revolve the arm into its braking position. In normal running the arm is held in the position shown in Fig. 8, where it is in contact with contact-plates 53, connected with the feed-circuit, by means of the pawl 54, which will be disengaged when the solenoid 55 becomes excited, so as to attract its iron core 56. The said solenoid is arranged to be directly excited by the safety-circuit, as described above. When the arm 50 is released, it will be rotated over the contacts 57 58 59 60, which are connected by means of resistance-coils 61, which during the rotation of the arm will be disconnected in succession until the arm reaches the position indicated by the dotted line E F, where the motor is completely short-circuited.

The device is also applicable as a safety-brake for electrical trains, in which case the pressure-buttons or other circuit-closers for actuating the switch are to be arranged in the respective carriages.

Having now described my invention and in what manner the same may be performed, what I claim as new, and desire to secure by Letters Patent, is—

1. The combination with an electric-motor circuit, of a switching device adapted to change the motor into generator, a safety-circuit adapted to release the said switching device, a local circuit, and a relay in the latter adapted to close the said safety-circuit, substantially as and for the purpose set forth.

2. The combination with an electric-motor circuit, of a switching device adapted to change the motor into generator, a safety-circuit adapted to release the said switching device, a local circuit, a relay in the latter adapted to bring the said safety-circuit into operation, and circuit-closers in the said local circuit, substantially as and for the purpose set forth.

3. The combination with an electric-motor circuit, of a switching device adapted to change the motor into generator, a safety-circuit adapted to release the said switching device, a local circuit, a relay in the latter adapted to close the said safety-circuit, circuit-closers in the said local circuit, and means for operating the said circuit-closers provided along the transmissions driven by the motor, substantially as and for the purpose set forth.

In testimony whereof I have signed my name to this specification in the presence of two subscribing witnesses.

ARTHUR HULTQVIST.

Witnesses:
  OSCAR MALMER,
  JACOB ESBIÖRNSON.